US012782912B2

(12) United States Patent
Fleischer et al.

(10) Patent No.: US 12,782,912 B2
(45) Date of Patent: Nov. 3, 2026

(54) METHOD, APPARATUS AND PROGRAM FOR DETERMINING CONSTRUCTION DATA OF THE DEEP-DRAWING TOOL GEOMETRY BY MEANS OF HYBRID SPRINGBACK COMPENSATION

(71) Applicant: Bayerische Motoren Werke Aktiengesellschaft, Munich (DE)

(72) Inventors: Michael Fleischer, Munich (DE); Ingo Heinle, Inzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1003 days.

(21) Appl. No.: 18/008,374

(22) PCT Filed: Jun. 29, 2021

(86) PCT No.: PCT/EP2021/067857
§ 371 (c)(1),
(2) Date: Jun. 16, 2023

(87) PCT Pub. No.: WO2022/022931
PCT Pub. Date: Feb. 3, 2022

(65) Prior Publication Data

US 2023/0288906 A1 Sep. 14, 2023

(30) Foreign Application Priority Data

Jul. 27, 2020 (DE) ..................... 10 2020 119 693.8

(51) Int. Cl.
*G05B 19/4093* (2006.01)
*B21D 22/20* (2006.01)

(52) U.S. Cl.
CPC ........ *G05B 19/40931* (2013.01); *B21D 22/20* (2013.01); *G05B 2219/36499* (2013.01)

(58) Field of Classification Search
CPC .............. G05B 19/40931; B21D 22/20; G06F 2113/24; G06F 2119/18; G06F 30/23; Y02P 90/02
See application file for complete search history.

(56) References Cited

U.S. PATENT DOCUMENTS

2004/0073323 A1 4/2004 Zhu et al.
2004/0176863 A1* 9/2004 Ren ........................ B21D 37/20 700/98

(Continued)

FOREIGN PATENT DOCUMENTS

CN 110355284 A 10/2019
DE 10 2017 220 660 A1 5/2019
WO WO 02/10332 A1 2/2002

OTHER PUBLICATIONS

Karalfillis et al., "Tooling and Binder Design for Sheet Metal Forming Processes Compensating Springback Error" Pergamon, International Journal of Machine Tools & Manufacture, Apr. 1, 1996, pp. 503-526, vol. 36, No. 4, XP055077172.

(Continued)

*Primary Examiner* — Brian W Wathen
(74) *Attorney, Agent, or Firm* — Crowell & Moring LLP

(57) ABSTRACT

Methods, systems, and devices for determining construction data for producing a forming die are provided. Using an electronic computing device, a simulation is carried out that includes moving die parts of a die toward each other to a closed position, reshaping a workpiece reshaping a workpiece from an initial state to a first deformed state due to the moving of the die parts to the closed position, keeping the die parts at least temporarily in the closed state to maintain the workpiece in the first deformed state, moving the die parts away from each other to an open position, and deforming the workpiece to a second deformed state from the first deformed state due to internal stresses of the workpiece and due to moving of the die parts to the open position. A geometry of a new die part that influences the reshaping is determined.

10 Claims, 1 Drawing Sheet

(56) References Cited

U.S. PATENT DOCUMENTS

| | | | | |
|---|---|---|---|---|
| 2018/0067468 | A1* | 3/2018 | Zhu | G05B 19/402 |
| 2018/0285488 | A1* | 10/2018 | Zhu | G06F 30/20 |
| 2019/0291163 | A1 | 9/2019 | Birkert et al. | |
| 2019/0311081 | A1* | 10/2019 | Heinle | B21D 37/20 |
| 2020/0309635 | A1* | 10/2020 | Urabe | B21C 51/00 |
| 2022/0088663 | A1* | 3/2022 | Urabe | B21D 22/20 |

OTHER PUBLICATIONS

English translation of Chinese language Office Action issued in Chinese Application No. 202180048731.1 dated Dec. 25, 2025 (10 pages).

International Search Report (PCT/ISA/210) issued in PCT Application No. PCT/EP2021/067857 dated Sep. 17, 2021 with English translation (four (4) pages).

German-language Written Opinion (PCT/ISA/237) issued in PCT Application No. PCT/EP2021/067857 dated Sep. 17, 2021 (nine (9) pages).

German-language Search Report issued in German Application No. 10 2020 119 693.8 dated Apr. 26, 2021 with partial English translation (14 pages).

Siswanto et al., "An Alternate Method to Springback Compensation for Sheet Metal Forming", The Scientific World Journal, 2014, pp. 1-14, vol. 2014, No. 301271, XP055838284, (14 pages).

Anggono et al., "Combined Method of Spring-forward and Spring-back for Die Compensation Acceleration", Advanced Dynamics and Vehicle Safety (AdVeS), Apr. 19, 2011, pp. 1-6, XP031876737, (six (6) pages).

Gan et al., "Die Design Method for Sheet Springback", International Journal of Mechanical Sciences, 2004, pp. 1097-1113, vol. 46, XP004573378, (17 pages).

* cited by examiner

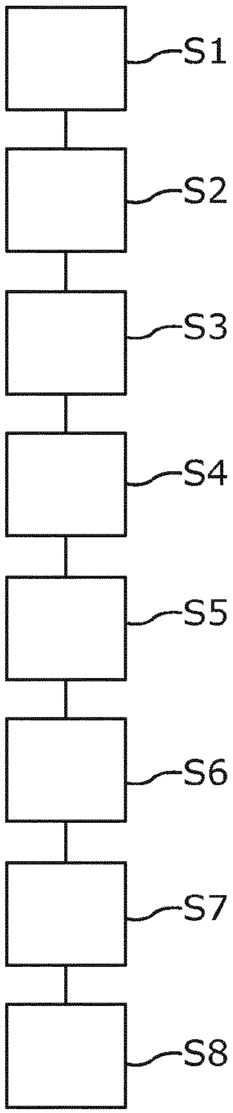
S1
S2
S3
S4
S5
S6
S7
S8

METHOD, APPARATUS AND PROGRAM FOR DETERMINING CONSTRUCTION DATA OF THE DEEP-DRAWING TOOL GEOMETRY BY MEANS OF HYBRID SPRINGBACK COMPENSATION

BACKGROUND AND SUMMARY OF THE INVENTION

The present subject matter relates to a method for determining design data for producing a forming die provided for reshaping components. In addition, the present subject matter relates to a use of such a method, an electronic computing device, a computer program and a computer-readable medium.

WO 02/10332 A1 discloses a method for reshaping structural components, which have a plate-like main body and elongated ribs extending approximately parallel to one another, integrally connected to the main body and extending approximately at right angles therefrom.

Furthermore, it is sufficiently known from the general prior art that forming dies for reshaping components, such as presses, are used. For example, using the respective forming die, the respective component is deep-drawn and reshaped as a result. To this end, for example, die parts, in particular die halves, of the forming die are moved toward each other and closed as a result. In this way, the component is reshaped and, as a result, for example brought from an original state into a first deformed state. While the die parts between which, for example, the component is arranged are kept closed, the component is in the aforementioned, first deformed state, wherein the component is kept in the first deformed state using the closed die parts, in particular as long as the die parts are closed or until the die parts are opened. In this first deformed state, internal stresses act within the component itself. The component is kept in the first deformed state counter to these internal stresses using the closed die parts. If, then, the die parts are moved away from each other and thus opened, the internal stresses can thus dissipate so that, as a result of opening the die parts, the component is deformed automatically or independently, starting from the first deformed state, which means that, for example, the component comes into a second deformed state, different from the first deformed state. This deformation of the component, resulting from the opening of the die parts and from the internal stresses described is also designated as springing up, spring up, springing back, spring back, elastic spring back, back-springing or elastic back-springing or springing open of the component. In the respective deformed state, the component has a respective shape. Preferably, the form of the component in the second deformed state corresponds to a desired final shape or a desired final geometry of the component, which can then, for example, be installed or processed further.

The respective deformed state and thus the respective shape depend on a geometry of the die, in particular of the die parts. The object of a respective construction or production of a forming die is to devise such a geometry of the forming die that the component is reshaped using the forming die in such a way that, after springing back, the component has a desired final shape or a desired final geometry. Usually, a large number of iteration steps is required in order to determine the geometry of the forming die and thus its shape iteratively in such a way that the shape of the component after springing back corresponds to the desired final shape. Since, usually, the geometry of the forming die is determined iteratively, the production of the forming die is usually very time consuming and costly.

The object of the present subject matter is, therefore, to devise a method, a use of such a method, an electronic computing device, a computer program and a computer-readable medium, so that forming dies for reshaping components, in particular for motor vehicles, can be produced in a particularly time-saving and cost-effective manner.

According to the present subject matter, this object is achieved by the subject matter of the independent patent claims. Advantageous refinements of the present subject matter are the subject matter of the dependent claims.

A first aspect of the present subject matter relates to a method for determining design data for the production, which means in particular for the construction and/or fabrication, of a forming die provided for reshaping, in particular deep-drawing, components, in particular for motor vehicles. If, for example, mention is made below of the or a forming die, then—if not otherwise indicated—this is to be understood as a or the actually physically existing, physical forming die which is or is to be produced on the basis of the design data. If, moreover, mention is made below of the or a component, then—if not otherwise specified—this is to be understood as the or an actually physically existing, physical component which is or can be reshaped using the forming die.

In a first step of the method, a first simulation is carried out using an electronic computing device. In or within the context of the first simulation, a simulation is carried out using the electronic computing device to the effect that die parts, in particular die halves, of a die are moved toward each other and, as a result, are moved into a closed position. If mention is made below of the die parts and the die, then—if not otherwise specified—this or these is or are not to be understood for instance as actually physically existing, physical die parts or an actually physically existing, physical die, instead—if not otherwise specified—the die parts or the die is or are to be understood as a computational or simulation model of the die parts or a computational or simulation model of the die, wherein the first simulation is carried out using the electronic computing device on the basis of the computational or simulation models. The respective simulation model is a virtual model of the die parts or of the die, for example comprising equations or formed of equations, so that, so to speak, the simulated die parts of the simulated die are moved toward each other. In other words, within the context of the first simulation it does not occur for instance that actually physically existing die parts of an actually existing, physical die are moved toward each other and closed as a result, instead, within the scope of the first simulation, it is simulated and thus modeled or depicted that die parts which could be actually present and be constituent parts of the actual physical die are moved toward each other.

In the first simulation, it is additionally simulated that, by moving the die parts into the closed position, a workpiece is reshaped and, as a result, is brought or transferred from an initial state into a first deformed state. If not otherwise specified, the workpiece is not necessarily to be understood as an actually physically existing, physical component, instead the simulation is carried out on the basis of a computational or simulation model of a or the workpiece or component which could exist physically. Thus, within the context of the first simulation, the or a workpiece is not actually reshaped, instead reshaping of an actual physical workpiece is simulated, which means modeled or depicted.

In the first simulation, it is additionally simulated that the die parts remain at least temporarily in the closed state and, as a result, keep the workpiece in the first deformed state. Furthermore, in the first simulation, it is simulated that the die parts are moved away from each other and, as a result, are moved from the closed position into an open position, which means opened. Furthermore, in the first simulation, it is simulated that, as a result of the movement of the die parts into the open position, which means as a result of the fact that the die parts are moved into the open position, the workpiece automatically deforms into a second deformed state, starting from the first deformed state, on the basis of internal stresses of the workpiece which is in the first deformed state. In other words, as a result of the fact that the workpiece is reshaped and thus brought into the first deformed state as a result of the fact that the die parts are moved toward each other and is kept in the first deformed state as a result of the fact that the die parts are kept closed, internal stresses act or exist in the workpiece that is in the first deformed state and while the die parts remain closed, wherein the workpiece is kept in the first deformed state using the closed die parts, counter to the internal stresses. If the die parts are then moved away from each other and as a result moved into the open position, which means opened, then the internal stresses can dissipate. As a result, the workpiece is deformed because of the internal stresses, starting from the first deformed state, automatically or independently, in such a way that the workpiece comes into the aforementioned, second deformed state. The processes described previously are simulated.

In a second step of the method, using the electronic computing device, a stress state which characterizes the internal stresses of the workpiece kept in the first deformed state using the closed die parts and as a result is in the first deformed state is calculated. In other words, the stress state describes the internal stresses which lead to the workpiece being deformed or reshaped automatically into the second deformed state, starting from the first deformed state, when the die parts are opened.

In a third step of the method, using the electronic computing device, the stress state is inverted, in particular mathematically. The, in particular mathematical, inversion of the stress state is to be understood in particular that the stress state, in particular vectors and/or parameters and/or values of the stress state, are rotated or reversed in terms of their, in particular mathematical, sign or signs. Thus, for example, as a result of the inversion a respective positive mathematical sign (+) becomes a mathematical negative sign (−) and a respective negative mathematical sign (−) becomes a respective positive mathematical sign (+). Using the inversion of the initially calculated stress state, an inverted stress state is calculated or determined. The inversion of the stress state is also designated as a stress inversion.

Furthermore, provision is made for the above-described automatic deformation of the workpiece into the second deformed state resulting from the stress state or from the internal stresses to be simulated on the basis of the inverted stress state. In other words, use is not made of the initially determined actual stress state in order to simulate the automatic deformation of the workpiece on the basis of this determined actual stress state, instead the initially determined actual stress state is inverted, using which the inverted stress state is calculated. The automatic deformation of the workpiece into the second deformation state is then simulated on the basis of the inverted stress state. In particular, the inversion of the stress state and consequences resulting therefrom can be understood from the following:

The simulated, automatic or independent deformation of the workpiece because of the stress state or of the internal stresses is also designated as springing up, springing back, springing open, spring up, springing back, back-springing, elastic back-springing or elastic springing back. If, for example, springing back were not to be simulated on the basis of the inverted stress state but on the basis of the actual non-inverted stress state then, for example, the workpiece would spring back in a first direction, at least in a subregion, starting from the first deformed state, because of the internal stresses. This first direction can be similar to or correspond to a direction in which an actually physically existing, physical component would also spring back when a forming die for reshaping the component were to be opened. This means that, even in an actual real forming process, in which a physical, actually existing component is reshaped, the springback described with respect to the (simulated) workpiece occurs when real die parts which are used for reshaping the real component are opened after they have been moved toward each other to reshape the real component, thus have been closed. The inversion of the stress state and, as a result of the fact that the springback on the basis of the inverted stress state is simulated in the first simulation, then leads, for example in comparison with the aforementioned first direction, to the workpiece not springing back in the first direction but in a second direction opposite to the first direction. This would or could thus in actual fact not take place but, in the simulation, for example, the workpiece springs in the opposite or in the same direction as the actual physical component.

In a fourth step of the method according to the present subject matter, provision is made that, using the electronic computing device and depending on the second deformed state, a geometry of the forming die that influences the reshaping is determined, in particular calculated. The feature that the geometry influences the reshaping is to be understood in particular to mean that the geometry has an effect on the reshaping or on its simulation. Once more expressed in other words, changes in the geometry lead to changes in the reshaping of the workpiece. The geometry is thus, for example, a die shape or a die contour of the die, the workpiece being reshaped using the die shape or using the die contour, in particular in the simulation. On the basis of the actual physically existing forming die, its geometry influencing the reshaping of the respective component is, for example, such a geometry, die shape or die contour of the actual forming die, wherein the respective component is or would be reshaped using the geometry, die shape or die contour of the actual forming die, for example in such a way that, during the actual reshaping, the geometry, die shape or die contour of the actual forming die comes or would come into contact, in particular direct contact, with the respective component.

The geometry which, in the fourth step, is calculated as a function of the second deformed state and thus determined using the electronic computing device is also designated as the first geometry and is in particular a simulated or virtual first geometry of the die, which means the simulated or virtual die which was used in the first simulation but there preferably with a starting geometry different from the first geometry. The first geometry is also designated as the first die geometry.

In other words, as a result of the fact that, on the basis of the inverted stress state, the automatic deformation of the workpiece from the first into the second deformed state is simulated, a shape of the workpiece that is in the second deformed state—in the simulation—is simulated or calculated. The first geometry is determined here in particular as a function of the (simulated) shape of the workpiece that is in the second deformed state.

In a fifth step of the method, using the electronic computing device, a second simulation is carried out, in particular after the first simulation. In the second simulation, it is simulated that starting from the initial state, the workpiece is reshaped using the die having the first geometry and, as a result, is transferred from the initial state into a third deformed state. Preferably, the third deformed state is different from the first deformed state since, preferably in the first simulation, the workpiece had the initial geometry that differs from the first geometry and, in the first simulation, starting from the initial state, the workpiece is or was reshaped using the die having the initial geometry, wherein, by contrast, in the second simulation, the die has the first geometry that preferably differs from the initial geometry and, starting from the initial state, the workpiece is reshaped using the die having the first geometry in the second simulation. Since the initial geometry and the first geometry influence the respective reshaping—as described above with respect to the first geometry—and since, preferably, the first geometry differs from the initial geometry, in the second simulation, starting from the same initial state, the workpiece is reshaped in another way or simulated otherwise than in the first simulation. The fact that in the second simulation the workpiece is reshaped in a different way or otherwise than in the first simulation is to be understood in particular to mean that the third deformed state differs from the first deformed state, consequently that the workpiece in the first deformed state has a first shape and in the third deformed state has a second shape that differs from the first shape. The previous and following explanations relating to the first simulation can readily also be transferred to the second simulation and vice versa. Thus, for example in the second simulation, it is simulated that the die parts of the die are moved toward each other, at least one of the die parts having the first geometry.

In a sixth step of the method, using the electronic computing device, the third deformed state is compared with a target state. Using the electronic computing device, a vector field which characterizes a difference between the third deformed state and the target state is calculated here. The feature that the vector field characterizes a difference between the third deformed state and the target state is in particular to be understood as follows: on the basis of the second deformed state and thus on the basis of the inverted stress state, the first geometry is determined which, in the ideal case, is already such that starting from the initial state, the first geometry or reshaping of the workpiece using the die having the first geometry already leads to the desired target state of the workpiece. As based on the actual forming die that is present in reality, this would mean that ideally if the forming die would have the first geometry and the respective component would be reshaped using the forming die having the first geometry, the respective component would as a result be brought from the initial state into the desired target state, that is to say would be reshaped. The target state is in particular to be understood to mean that in the target state the workpiece or component has a desired target shape.

However, it has been found that, on the basis of the inversion of the stress state, the first geometry cannot necessarily be created without further measures such that the first geometry or the reshaping using the die or forming die having the first geometry leads to the desired target state. In other words, it has been found that the third deformed state does not necessarily correspond to the target state, instead differs unduly from the target state. In order to compensate adequately for such a possible deviation of the third state from the target state, the sixth step is carried out. Once more expressed in other words, it has surprisingly been found that the first geometry of the die or the forming die cannot necessarily be created using the stress inversion on its own such that no undesired differences between the third deformed state and the target state occur. Therefore—as will be explained further below—a path inversion is also carried out, in particular after and/or on the basis of the stress inversion. The path inversion is to be understood as an inversion of the vector field with regard to a path described in particular by the vector field.

The vector field comprises a plurality of vectors, for example. The respective vector defines or describes, for example for a respective point or a respective area or a respective location of the workpiece that is in the third state, a path or a distance by which the respective point, the respective region or the respective location must be moved, in particular displaced, in particular in a direction in order to transfer the workpiece from the third deformed state into the target state, consequently to eliminate or compensate for the difference between the third deformed state and the target state. In particular, the respective vector also defines, describes or characterizes the aforementioned direction in which the respective point must be displaced or moved by the respective path.

In a seventh step of the method, the aforementioned path inversion is carried out using the electronic computing device. During the path inversion, the vector field is inverted, in particular mathematically. The, in particular mathematical, inversion of the vector field is in particular to be understood—for example as in the case of the stress inversion—to mean that the vector field, in particular the vectors and/or parameters and/or values of the vector field, are rotated or reversed in terms of their, in particular mathematical, sign or signs. Thus, for example, as a result of the path inversion, a respective positive mathematical sign (+) becomes a mathematical negative sign (−), and a respective negative mathematical sign (−) becomes a respective positive mathematical sign (+). As a result of the inversion of the initially calculated vector field, an inverted vector field is calculated or determined.

In an eighth step of the method, using the electronic computing device, the design data are calculated as a function of the first geometry and as a function of the inverted vector field. For example, the inverted vector field is added to the first geometry. This is to be understood to mean in particular that the first geometry is added to the inverted vector field, so that, so to speak, the first geometry is displaced by the inverted vector field or by a distance characterized by the inverted vector field, in particular in a direction characterized by the inverted vector field. Thus, for example, a second geometry of the die is determined, in particular calculated, from the first geometry, wherein the second geometry is characterized by the design data so that, on the basis of the design data, the actual physically existing forming die is or can be produced in such a way that the forming die has the second geometry influencing the reshaping of the respective component.

Preferably, after the eighth step, a ninth step is carried out, in which a third simulation is carried out which, in principle, can correspond to the second simulation, in particular with the difference that, during the third simulation, the die has a second geometry, preferably differing from the geometry which, for example, is characterized or described by the design data and was thus generated on the basis of the first geometry and of the inverted vector field. In a way analogous to the second simulation, the component is reshaped using the die having the second geometry and, as a result, is transferred from the initial state into a fourth deformed state. Using the electronic computing device, the fourth deformed state is compared with the target state and, as a result, checked to see whether a difference exists between the fourth deformed state and the target state. If no difference between the fourth state and the target state exists or if the difference is smaller than a threshold value, then the forming die can be produced on the basis of the design data. However, if the difference exceeds the threshold value, then, if necessary as in the seventh step, at least one further path inversion is carried out, by means or on the basis of which, if appropriate, a further vector field inversion and, if necessary on the basis thereof, a new third geometry or new design data are generated. The ninth step is thus a control calculation or a control step for checking the generated design data.

It has been found that as a result of the inversion of the stress state (stress inversion) and the use of the inverted stress state in order to determine the second deformed state, the first geometry and, as a result—in particular by using the path inversion—the design data can be calculated and thus determined in such a way that, on the basis of the design data, by using only a small number of iterations or even without any iterations, such a geometry, in particular in the form of the second geometry, of the forming die can be determined and in particular produced or fabricated such that this (second) geometry of the forming die leads to the actual physical component having a desired final geometry or final shape after reshaping effected using the forming die and in particular following the springing back or springback. As compared with conventional solutions, the method according to the present subject matter thus makes it possible to avoid a large number of iteration steps for finding such a geometry of the forming die that the component has a desired final geometry after springing back. In other words, the method according to the present subject matter makes particularly time-saving and cost-effective production of the forming die possible since, directly or with only little outlay, it is possible to devise a geometry which creates a desired target geometry of the component following its production or reshaping.

The present subject matter is based in particular on the following findings:

Conventionally, what is known as simulation-based springback compensation is carried out, in order to find such a geometry of a forming die for reshaping components iteratively in such a way that the geometry with which the component is reshaped has the effect that the component comes into a desired final shape or final geometry after or as a result of its springing back. In the simulation-based springback compensation provision is made, for example, that following a development of a fabrication method for fabricating a component which, for example, can be a bodywork component or a self-supporting body for a motor vehicle, in particular for a passenger car, the elastic springback of the component is determined on the basis of a reshaping and springback simulation. The above explanations relating to the springing back of the workpiece can readily also be transferred to springback of an actually physically existing, physical component. Thus, the elastic springback of the component is to be understood as follows: if, for example, the forming die is closed in that, for example, physically present die parts of the forming die are moved toward each other, then the component is reshaped as a result. If the die parts of the forming die are initially kept closed, then the component is kept in a deformed or reshaped state in which internal stresses act within the component. The component is held in the deformed state using the die parts of the forming die counter to these internal stresses. If, then, the die parts of the forming die are moved away from each other, which means opened, the component can deform automatically or independently because of the internal stresses, in particular in the direction of an original state starting from which the component has been reshaped. It is also designated as springing up, springing back, springing open or springback. In the (first) deformed state, the workpiece or component is, for example, in a so-called further initial state. After springing back, the workpiece or component is in a final state which, for example, is the aforementioned second deformed state. Conventionally, during the springback simulation, the initial state and the final state are described using topologically identical FEM networks (FEM—Finite Element Method). These two FEM networks, simply also designated as networks, differ only in their node coordinates. Therefore, in addition to a so-called sprung-back geometry, a vector field between an initial state and the final state is also known or can be determined, in particular in a discretized form. The sprung-back geometry is, for example, a geometry of the workpiece or component after springing up, also called springback. The aforementioned vector field thus characterizes, for example, a difference between the initial state and the final state. In particular, for example, the vector field characterizes, for example, paths and/or directions and/or distances in which nodes of the network characterizing the initial state must be or would have to be moved or displaced in order to obtain therefrom the network characterizing the final state. In a next process step, a network-based correction rule can be derived from the vector field, by using which, for example, an original initial geometry of the forming die or the die can be corrected in order as a result, for example, to obtain a further geometry of the die or forming die in such a way that the final state does not differ or differs slightly from a desired target state, which means from a desired final geometry or a desired final shape. By using the correction rule, for example active surfaces of the die parts, also designated as die active surfaces, can be corrected geometrically. The active surfaces are to be understood in particular as those surfaces of the die parts which, during the reshaping of the component or workpiece, come into contact, in particular direct contact, with the workpiece or the component, so that the workpiece or component is reshaped using the active surfaces.

In order, for example, to achieve that the component comes into the desired final shape or at least close to the final shape as a result of springing back, for example over-bending of the die active surfaces is determined, in particular calculated. In order to calculate this necessary over-bending of the die active surfaces, the aforementioned vector field is usually path-inverted. The path inversion is to be understood as an inversion of the vector field with regard to the path. In other words, the part of the word "path" of the word "path-inverting" is not to be understood as the adverb "away", which designates a removal from a specific position, place or a specific location, instead the part of the word "path" of the word "path-inverting" is to be understood as the noun "path" or as relating to the noun "path". The springback compensation is concluded, for example, using adapting or correcting the die active surfaces described for example by CAD data. In other words, for example, CAD data which describe the die active surfaces are corrected on the basis of the path inversion of the vector field, as a result of which, for example, the die active surfaces are corrected, in particular over-bent (CAD— computer-aided design). This is then followed by an inspection of the effectiveness of the compensation measure and, if necessary, a further correction loop based on the same principle. In other words, if, for example, a simulation and/or a trial results in the component or the workpiece continuing to deviate unduly highly from the desired final shape after springing back when it is reshaped using the die parts having the corrected die active surfaces, then the die active surfaces are corrected again in the above-described manner. Thus, an iterative and thus time-consuming and costly process is usually necessary in order to find a desired geometry of the forming die in such a way that the geometry leads to the component not deviating or not deviating unduly from the desired end shape after springing back.

Usually, the fabrication of individual bodywork parts, in particular from steel and aluminum, is generally carried out in a plurality of operations. Firstly, a panel, in particular a formed panel, is deep-drawn in a first operation. This is then followed, as a function of the component geometry, by further reshaping, trimming and post-forming operations. When the forming die is closed, contact forces act between the die active surfaces and the component or workpiece that is formed of sheet metal, for example, is reshaped and is in the (first) deformed state. In the process, an equilibrium state is established between external contact forces and the internal stresses in the component, in particular in the material of the latter. The external contact forces are to be understood in particular as those forces which act on the component from outside the component and thus, for example, from the die parts, in particular via the active surfaces, and keep the component in the (first) deformed state while the die parts of the forming die are closed.

Following the opening of the die or the forming die, the external contact forces can no longer act. Therefore, a new equilibrium state is established, which results in elastic deformation of the component. This elastic deformation of the component is the previously described springing up, springing back, springing open or springback. Following the springing back and thus, for example, in the second deformed state, inherent stresses in the component, formed from sheet metal, for example, are in equilibrium. This effect is designated as the previously described springing up or as springing open or springback, in particular elastic springback. The elastic springback (springing up or springing open) is a physical effect which, as a rule, can only be reduced but not avoided. The previously described springback compensation is understood in particular to mean a determination of a so-called holding measure for a forming die, so that, following the elastic springback, a target geometry of the component is established, which means that the component, in particular its shape, corresponds to the desired final shape following the elastic springback or at least does not deviate unduly from the final shape.

As distinct from conventional solutions, in the method according to the present subject matter not only is the previously described path inversion provided but the described inversion of the stress state (stress inversion) following the closure of the die parts and before the opening of the die parts. In other words, the simulation of the elastic springback is carried out on the basis of the inverted stress state. The simulation of the automatic deformation of the workpiece into the second deformed state is also designated as the springback simulation. The second deformed state and, for example a or the shape of the workpiece in the second deformed state are, for example, results of the springback simulation. On the basis of the springback simulation and in particular on the basis of the result or the results of the springback simulation, the design data are determined, in particular calculated. According to the present subject matter, after the simulation-based stress inversion which, preferably, is carried out at least or exactly once, the simulation-based path inversion is carried out. Preferably, the simulation-based path inversion is carried out at least or exactly once. In particular, the simulation-based path inversion can be carried out several times. Furthermore, it is conceivable, in particular after the simulation-based path inversion, to carry out a measured data-based path inversion, in particular at least or exactly once or several times in order to compensate for further possible deviations. If not otherwise specified, the "path inversion" is to be understood below as the above-described simulation-based path inversion. The combination according to the present subject matter of stress and path inversion can be applied to or used for all working sequences.

In order to be able to determine the design data in a particularly time-saving and cost-effective manner and as a result to be able to produce the forming die in a particularly time-saving and cost-effective manner, one example of the present subject matter provides for deep-drawing of the workpiece to be simulated as the reshaping of the workpiece.

Alternatively or additionally, provision is made for the workpiece to be simulated as a sheet metal component.

In a particularly advantageous example of the present subject matter, a first shape of the workpiece in the first deformed state and a second shape of the workpiece in the second deformed state is simulated using the electronic computing device, wherein the first geometry and thus the design data are calculated using the electronic computing device as a function of the simulated shapes. In this way, the design data can be calculated in a particularly time-saving and cost-effective manner.

Here, it has been shown to be particularly advantageous if, using the electronic computing device, a further vector field characterizing a difference between the shapes is calculated, wherein the first geometry is calculated using the electronic computing device as a function of the further vector field. As a result, the first geometry and thus the design data can be determined in a particularly time-saving and cost-effective manner, so that the forming die can be produced in a particularly time-saving and cost-effective manner.

The respective shape is characterized, for example, by a respective FEM network, simply also designated as a network, which, for example, has network nodes, simply also designated as nodes, and, possibly, connecting elements connecting the network nodes to one another, in particular straight lines or rods. The vector field characterizes, for example, here an, in particular location-based, difference between the nodes of the network characterizing the first shape and the nodes of the network characterizing the second shape. For example, the further vector field describes distances and/or paths and/or directions along which or in which, for example, the nodes of the network characterizing the first shape must or would have to be moved or displaced in order to coincide with the nodes of the network characterizing the second shape or to come to lie on the nodes of the network characterizing the second shape. In other words, from the result of the springback simulation, it is possible for the vector field which describes a necessary correction to the die parts to be derived directly, in such a way that the second shape resulting from the correction already comes very close to the desired target shape. Remaining differences can then be compensated, for example, by the simulation-based path inversion.

Thus, it has been shown to be particularly advantageous if the first simulation is carried out on the basis of a simulation model of the die, wherein the simulation model describes the above-mentioned initial geometry of the die.

In this case, it has been shown to be particularly advantageous if the initial geometry of the die is changed as a function of the second deformed state, by which means the first geometry of the forming die to be produced, that is different from the initial geometry, is determined. Even the first geometry determined for the first time, for example, can already be such a geometry which—if it is implemented on the actual forming die—leads to the component having a shape after the elastic springback which comes very close to the desired target shape, consequently does not deviate unduly highly from the desired target shape. Thus, the forming die can be produced in a particularly time-saving and cost-effective manner. Remaining differences can then be eliminated using the following path inversion.

It is particularly advantageous in the method according to the present subject matter that, as compared with the sole use of the path inversion, considerably fewer iteration loops are required to achieve the desired geometry, also designated as component geometry, of the forming die or the die parts of the forming die. According to previous experience, the combination according to the present subject matter of stress inversion and subsequent path inversion is expedient in order to create such a geometry of the forming die in a time-saving and cost-effective way, so that, following its reshaping, the component has a geometry which corresponds or at least comes very close to the desired target geometry. Furthermore, in the event of more complex deformations such as, for example, during twisting of a vehicle pillar, formed as an A pillar, for example, of a self-supporting body, a great change in the length relationships or processing lengths can arise as a result of the path inversion. This effect does not occur during the inversion of the stress state.

A second aspect of the present subject matter relates to a use of a or the method according to the present subject matter according to the first aspect of the present subject matter. Within the context of the use, the method is used in order to produce a or the forming die. Advantages and advantageous refinements of the first aspect of the present subject matter are to be viewed as advantages and advantageous refinements of the second aspect of the present subject matter and vice versa.

In particular, in the second aspect of the present subject matter, provision is made for the forming die to be produced actually, which means physically and, for example, mechanically, on the basis of the design data. Provision can in particular be made here for the active surfaces of the die parts to be produced, in particular shaped, on the basis of the design data.

A third aspect of the present subject matter relates to an electronic computing device, which is designed to carry out a method according to the present subject matter according to the first aspect of the present subject matter. Advantages and advantageous refinements of the first aspect and of the second aspect of the present subject matter are to be viewed as advantages and advantageous refinements of the third aspect of the present subject matter and vice versa.

A fourth aspect of the present subject matter relates to a computer program which comprises commands such that the electronic computing device according to the third aspect of the present subject matter carries out the method according to the first aspect of the present subject matter. Advantages and advantageous refinements of the first, second and third aspect of the present subject matter are to be viewed as advantages and advantageous refinements of the fourth aspect of the present subject matter and vice versa.

Finally, a fifth aspect of the present subject matter relates to a computer-readable medium on which the computer program according to the fourth aspect of the present subject matter is stored. Advantages and advantageous refinements of the first, second, third and fourth aspect of the present subject matter are to be viewed as advantages and advantageous refinements of the fifth aspect of the present subject matter and vice versa.

Further details of the present subject matter emerge from the following description of a preferred example with the associated drawing.

BRIEF DESCRIPTION OF THE DRAWING

FIG. 1 shows a flowchart to illustrate a method according to the present subject matter for determining design data for producing a forming die provided for reshaping components.

DETAILED DESCRIPTION

A method is described below using which design data are determined, in particular calculated. The design data can be used or are used in order to produce an actually physically existing, physical forming die, which means to design and/or to fabricate the same. In its finished or completely produced state, the forming die has die elements which are also designated as die parts or die halves. The die elements can be moved relative to each other, in particular translationally, and as a result moved toward each other and away from each other. In order, for example, to reshape an actually physically existing, physical component using the forming die, the component is laid in the forming die—while the die parts and thus the forming die are open—consequently arranged between the die parts that have been opened and moved apart from each other here or away from each other. The die parts are then moved toward each other, as a result of which the die parts and thus the forming die are closed, while the component is arranged between the die parts. The fact that the die parts are moved toward each other, consequently closed, means that respective active surfaces of the die parts, also designated as die active surfaces, come into at least indirect, in particular direct, contact with the component, in particular at least with respective partial or wall regions of the component. As a result, the die parts exert external forces, in particular external contact forces, on the component via the active surfaces, as a result of which the component, in particular starting from an original state, is reshaped and, as a result, brought for example into a first deformed state. If the die parts are initially kept closed, then the contact forces continue to act from the die parts on the component, which is thus kept in the first deformed state. In the first deformed state, internal stresses act within the component, wherein the component, despite or counter to the internal stresses, is kept in the first deformed state using the closed die parts. If, then, the die parts are moved away from each other, consequently opened, then the internal stresses can be dissipated, so that the component, starting from the first deformed state, deforms automatically or independently into a second deformed state because of the internal stresses and because of the opening of the die parts.

This takes place since, as a result of opening the die parts, external contact forces from the die parts can no longer act on the component. The automatic deformation of the component, starting from the first deformed state and, for example, taking place because of the internal stresses, is also designated as springing up, spring up, springing back, spring back, springing open or elastic springback. As a result of the elastic springback, the component therefore comes into the second deformed state, in which the component, for example, has or assumes a final state and, for example, a final shape or final geometry in the process. The first deformed state is also designated as an initial state, for example, in which the component has or assumes an initial shape or initial geometry, for example. It is desirable here that the final shape or final geometry does not differ or not differ unduly from a desired target shape or target geometry. The method now makes it possible to find such a geometry of the die parts, in particular of the active surfaces, in a time-saving and cost-efficient manner, such that the final shape or final geometry of the component, following the elastic springback, corresponds to the desired target shape or target geometry or at least does not differ unduly from the target shape or target geometry.

To this end, in a first step S1 of the method, provision is made for a simulation to be carried out using an electronic computing device. In the simulation, it is simulated that die parts of a die are moved toward each other and, as a result, are moved into a closed position. The die used within the context of the simulation is, for example, the aforementioned forming die or a simulation or a simulation model of the forming die so that, for example, the die parts used within the context of the simulation or mentioned with respect to the simulation can be the die parts or simulation models of the die parts of the forming die. In the simulation, it is additionally simulated that, as a result of moving the die parts into the closed position, a workpiece is reshaped and, as a result, is transferred from an initial state into a first deformed state.

The workpiece mentioned or used within the context of the simulation is thus, for example, the component or a simulation model of the or a physical component. In the simulation, it is additionally simulated that the die parts remain at least temporarily in the closed state and, as a result, keep the workpiece in the first deformed state. In the simulation, it is additionally simulated that the die parts are moved away from each other and, as a result, moved from the closed position into an open position, consequently opened. In the simulation, it is further simulated that, as a result of the movement of the die parts into the open position, starting from the first deformed state, the workpiece deforms automatically into a second deformed state on account of internal stresses of the workpiece that is in the first deformed state.

In a second step S2 of the method, using the electronic computing device, a stress state is calculated, which characterizes the internal stresses of the workpiece that is held in the first deformed state and, as a result, is in the first deformed state.

In a third step S3 of the method, using the electronic computing device, the stress state is inverted, in particular mathematically, as a result of which an inverted stress state is calculated from the initially determined actual stress state. The inversion of the stress state, also designated as inversion or stress inversion, comprises, for example, that, in particular all, mathematical signs of the actual stress state are inverted. Thus, for example, positive signs become negative signs and vice versa. In the method, provision is additionally made for the automatic deformation of the workpiece into the second deformed state, consequently the elastic springback, to be simulated on the basis of the inverted stress state.

In a fourth step S4 of the method, using the electronic computing device and as a function of the second deformed state, a geometry of the forming die influencing the reshaping and also designated as first geometry is determined, in particular calculated.

For example, respective shapes of the workpiece in the deformed states are calculated. In addition, for example, a first vector field is calculated, which describes a difference between the shape of the workpiece in the first deformed state and the shape of the workpiece in the second deformed state. By using the first vector field, a correction or a correction rule can be determined or the vector field is a correction or correction rule, wherein the correction or correction rule describes such a geometry in the form of the first geometry or such a change of a starting initial geometry of the die into the first geometry of the tool parts such that the first geometry of the die parts resulting from the change in the initial geometry and different from the initial geometry leads to the situation in which, when the component is reshaped using the die parts, following the elastic springback, the component has such a shape which already very closely resembles the desired target shape. In order to compensate for any remaining differences and thus to be able to determine the design data in a particularly time-saving and cost-efficient manner and, as a result, to be able to produce the forming die or its die parts in a particularly time-saving and cost-efficient manner, in a fifth step S5 of the method, a second simulation is carried out using the electronic computing device, in particular after the first simulation. In the second simulation, it is simulated that, starting from the initial state, the workpiece is reshaped using the die having the first geometry and, as a result, is transferred from the initial state into a third deformed state. Preferably, the third deformed state is different from the first deformed state since, preferably, in the first simulation the die had the initial geometry different from the first geometry and, in the first simulation, starting from the initial state, the workpiece is or was reshaped using the die having the initial geometry, wherein, by contrast, in the second simulation the die has the first geometry preferably differing from the initial geometry and, in the second simulation, starting from the initial state, the workpiece is reshaped using the die having the first geometry.

In a sixth step S6 of the method, the third deformed state is compared with a target state using the electronic computing device. The target state corresponds to the desired target shape, so that the workpiece then has the target state if the workpiece has the target shape. A second vector field, which characterizes a difference between the third deformed state and the target state, is calculated here using the electronic computing device.

In a seventh step S7 of the method, a path inversion is carried out using the electronic computing device, in which the second vector field is inverted, in particular mathematically. As a result of the inversion of the initially calculated second vector field, an inverted vector field is calculated or determined. In an eighth step S8 of the method, using the electronic computing device, the design data are finally calculated as a function of the first geometry and as a function of the inverted vector field. It should be mentioned at this point that the stress inversion can be carried out exactly once, that is to say performed a single time, consequently once and, in particular, the combination of stress inversion and path inversion is therefore carried out in order to be able to implement the forming die in a time-saving and cost-efficient manner. However, it is entirely conceivable that the path inversion can nevertheless be carried out at least once or repeatedly after that.

The invention claimed is:

1. A method for determining design data for producing a forming die provided for reshaping components, comprising:

carrying out, using an electronic computing device, a first simulation, comprising:

moving die parts of a die toward each other to a closed position, reshaping a workpiece from an initial state to a first deformed state due to the moving of the die parts to the closed position, keeping the die parts at least temporarily in the closed position to maintain the workpiece in the first deformed state, moving the die parts away from each other to an open position, and deforming the workpiece to a second deformed state from the first deformed state due to internal stresses of the workpiece and due to moving of the die parts to the open position;

calculating, using the electronic computing device, a stress state that characterizes the internal stresses of the workpiece while in the first deformed state, wherein the deformation of the workpiece in the second deformed state is based on an inversion of the stress state;

determining, using the electronic computing device, a geometry of a new die part that influences the reshaping; and carrying out, using the electronic computing device, a second simulation comprising:

reshaping the workpiece using the new die part having the geometry from an initial state to a third deformed state, comparing the third deformed state with a target state, calculating a vector field that characterizes a difference between the third deformed state and the target state, and calculating the design data as a function of the geometry and an inversion of the vector field.

2. The method according to claim 1, wherein the reshaping of the workpiece is a deep-drawing of the workpiece.

3. The method according to claim 1, wherein the workpiece is a sheet metal component.

4. The method according to claim 1, further comprising:

simulating, using the electronic computing device:

a first shape of the workpiece in the first deformed state, and a second shape of the workpiece in the second deformed state, wherein the geometry is calculated using the electronic computing device as a function of the simulated first and second shapes.

5. The method according to claim 4, further comprising:

calculating a further vector field characterizing a difference between the first and second simulated shapes is calculated, wherein the geometry is calculated using the electronic computing device as a function of the further vector field.

6. The method according to claim 1, wherein the first simulation is carried out based on a simulation model of the die, wherein the simulation model describes an initial geometry of the die.

7. The method according to claim 6, wherein the initial geometry of the die is changed to a different geometry of the new die part as a function of the second deformed state.

8. The use of a method according to claim 1, wherein the method is used to produce the forming die.

9. An electronic computing device comprising:

a processor; and a memory in communication with the processor and storing instructions executable by the processor to configure the electronic computing device to perform the method according to claim 1.

10. A non-transitory computer readable medium comprising instructions operable, when executed by one or more computing systems to configure the one or more computing systems to carry out the method according to claim 1.

* * * * *